(12) United States Patent
Cha (10) Patent No.: US 8,285,220 B2
(45) Date of Patent: Oct. 9, 2012

(54) METHOD AND APPARATUS FOR REDUCING A CHANNEL DEVIATION IN A MOBILE COMMUNICATION TERMINAL

(75) Inventor: Hyun-Sik Cha, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 474 days.

(21) Appl. No.: 12/641,672

(22) Filed: Dec. 18, 2009

(65) Prior Publication Data

US 2010/0157856 A1  Jun. 24, 2010

(30) Foreign Application Priority Data

Dec. 19, 2008  (KR) .................. 10-2008-0130241

(51) Int. Cl.
*H04B 17/00* (2006.01)
*H03C 1/52* (2006.01)

(52) U.S. Cl. .................. 455/67.13; 455/107; 455/276.1

(58) Field of Classification Search ............... 455/9, 10, 455/63.1, 67.13, 107, 114.3, 180.4, 195.2, 455/276.1, 262, 304

See application file for complete search history.

(56) References Cited

U.S. PATENT DOCUMENTS

| | | | |
|---|---|---|---|
| 5,710,710 A * | 1/1998 | Owen et al. ............... 702/75 |
| 2006/0009165 A1 * | 1/2006 | Alles ............... 455/88 |
| 2008/0150800 A1 * | 6/2008 | Tsuji ............... 342/368 |
| 2008/0220737 A1 * | 9/2008 | Elwan et al. ............... 455/307 |
| 2008/0266021 A1 * | 10/2008 | Van Bezooijen et al. ....... 333/32 |
| 2009/0079656 A1 * | 3/2009 | Peyla et al. ............... 343/860 |

* cited by examiner

*Primary Examiner* — Andrew Lee
(74) *Attorney, Agent, or Firm* — Cha & Reiter, LLC (57) ABSTRACT

A transmitting apparatus and a transmitting method for improving a channel deviation in a mobile communication terminal are provided. The transmitting apparatus includes a power amplifier for amplifying a transmitting signal by a predetermined level and outputting an amplified transmitting signal, a controller for outputting a signal to control a variable capacitor according to a channel of the transmitting signal and a phase transition unit for varying each capacitance value according to a control of the controller and transiting a phase of a signal outputted from the power amplifier.

12 Claims, 8 Drawing Sheets

METHOD AND APPARATUS FOR REDUCING A CHANNEL DEVIATION IN A MOBILE COMMUNICATION TERMINAL

CLAIM OF PRIORITY

The present application claims priority under 35 U.S.C. §119 to a Korean patent application filed in the Korean Intellectual Property Office on Dec. 19, 2008 and assigned Serial No. 10-2008-0130241, the entire disclosure of which is hereby incorporated by reference in its entirety.

TECHNICAL FIELD OF THE INVENTION

Field of the Invention

The present invention relates to a transmitting apparatus and a transmitting method for reducing a channel deviation in a mobile communication terminal, more particularly for an apparatus and a method for reducing a conductive deviation per channel by adaptively shifting a phase of an output matching terminal of a power amplifier in a mobile communication terminal.

BACKGROUND OF THE INVENTION

Generally, a terminal which supports a Universal Mobile Telecommunications System (UMTS) protocol amplifies weak signals of voice and data modulated, via an antenna, from a baseband chip by a specific level of power in order to establish a call connection with a base station.

A transmitting characteristic, by an impedance, of a RF signal through a power amplifier of the terminal changes significantly as a frequency increases. Thus, an impedance conformity is should be performed in operation between the power amplifier and the antenna.

The impedance conformity is performed at the terminal between the power amplifier and the antenna by using load pull (source-pull with respect to the signal source), which provides coupling a tuner to the input or output of the terminal and adjusting the tuner impedance while monitoring to find an optimum impedance in terms of output power, gain, and so forth. A transistor in the power amplifier outputs a maximum power when the optimum load impedance is used. The load pull measurements used in a conventional technology are determined by vendors of the power amplifiers. However, a test to the power amplifier is typically preformed using the load full measurements.

Figure 1:
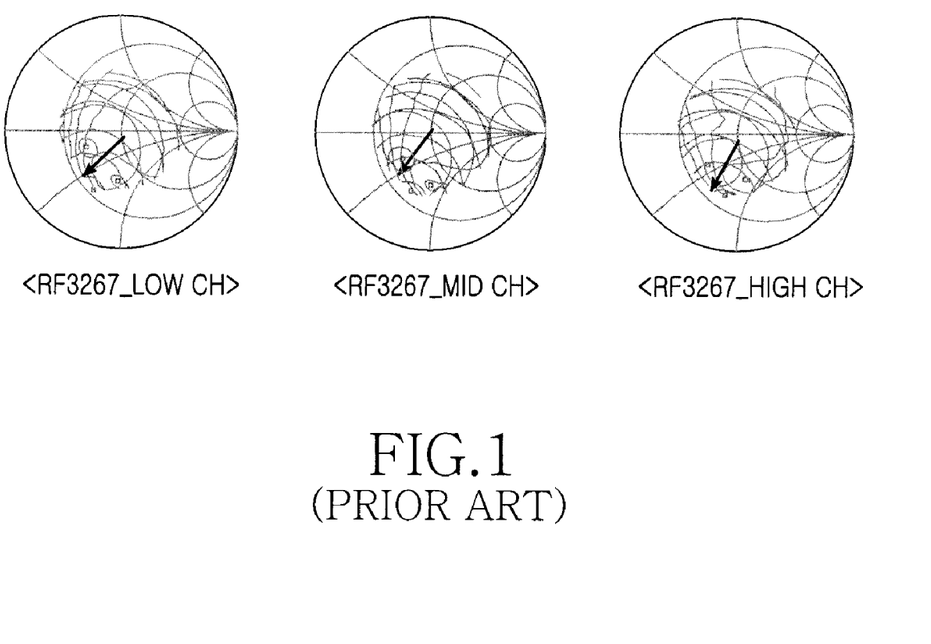
FIG. 1 illustrates a characteristic per each channel in a power amplifier which load full data is applied in a conventional technology.
Figure 2:
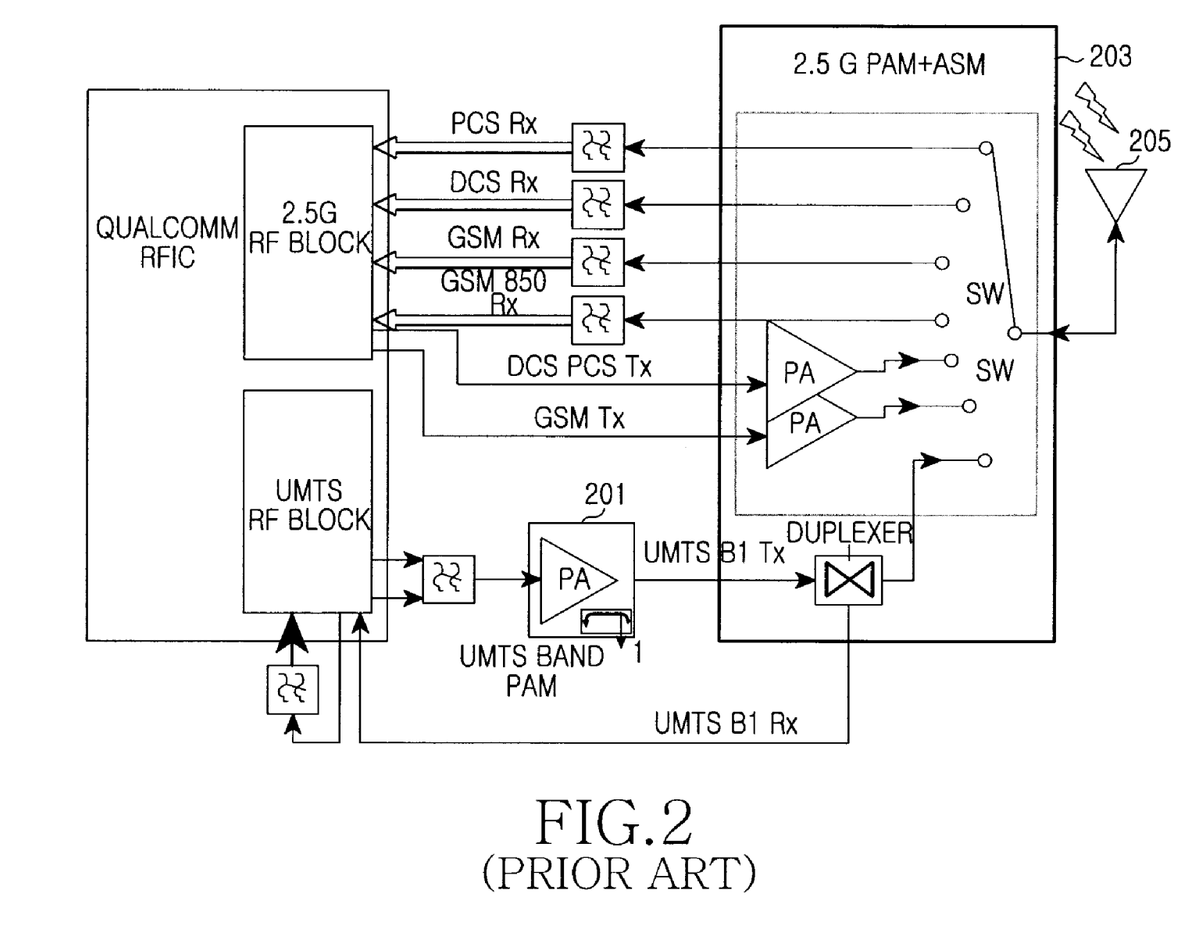
FIG. 2 illustrates a block diagram for an UMTS terminal in a conventional technology.

Normally, each communication channel has a similar characteristic in an identical phase as illustrated in FIG. 1. However, as illustrated in FIG. 2, because some elements between a power amplifier 201 and an antenna 205 exist in a real terminal, distorted load full measurements are produced when the load pull is only applied to the power amplifier.

Figure 3:
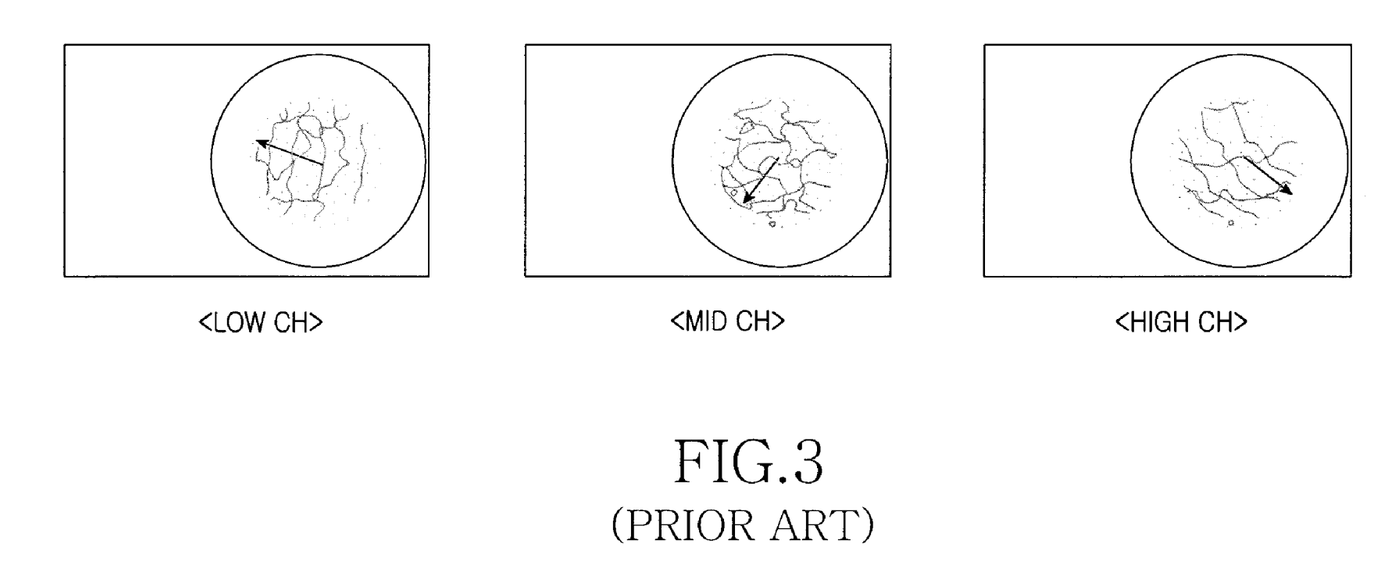
FIG. 3 illustrates a channel deviation according to a phase change of a channel in an UMTS terminal in a conventional technology.

Further, when only the load pull for the power amplifier is applied as in the conventional technology, because a Scattering parameter of the front end module 203 serves as a buffer, a Voltage Standing Wave Ratio (VSWR) is increased so that a deviation per channel increases as illustrated in FIG. 3.

Moreover, due to deviations of a power, a current, an Adjacent Channel Leakage Ratio (ACLR) and an Inner Loop Power Control (ILPC) are increased.

To address this problem, when the deviation per channel is occurred, a tuning is used in order to minimize the deviation by changing a fixed matching value of an output terminal of the power amplifier or by changing a fixed matching value of the antenna in the conventional art. However, when the conventional scheme is used, a trade off must be considered between parameters such as the power, the current, the ACLR and the ILPC in attempts to limit the interference level within the system. Hence, not all channels can achieve a desired quality of service with a minimum transmit power level.

SUMMARY OF THE INVENTION

An exemplary aspect of the present invention is to provide an apparatus and a method for reducing a channel deviation in a mobile communication terminal.

Another exemplary aspect of the present invention is to provide an apparatus and a method for adaptively changing a phase output matching terminal of a power amplifier in a mobile communication terminal.

Yet another exemplary aspect of the present invention is to provide an apparatus and a method for reducing a conductive deviation per channel by adaptively shifting a phase, per a channel, of an output matching terminal of a power amplifier in a mobile communication terminal.

In accordance with an aspect of the present invention, the transmitting apparatus for reducing a channel deviation in a mobile communication terminal includes a power amplifier for amplifying a transmitting signal by a specific level and outputting an amplified transmitting signal, a controller for outputting a signal to control a variable capacitor according to a channel of the transmitting signal and a phase shifting unit for including two capacitors, where each capacitance value varies according to a control of the controller, and shifting a phase of a signal outputted from the power amplifier In accordance with another aspect of the present invention, the transmitting method for reducing a channel deviation in a mobile communication terminal includes amplifying a transmitting signal by a specific level and outputting an amplified transmitting signal, determining a capacitance value of a variable capacitor according to a channel of the transmitting signal and shifting a phase of the amplified transmitting signal by controlling a capacitance value of the variable capacitor according to the determined capacitance value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controlling unit" means any device, system or part thereof that controls at least one operation, such a device may be implemented in hardware, firmware or software, or some combination of at least two of the same. It should be noted that the functionality associated with any particular controlling unit may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a transmitting apparatus and a method for reducing a conductive deviation per channel by adaptively shifting a phase of an output matching terminal of a power amplifier according to a change of channel in a mobile communication terminal will be described.

For illustrative purposes, the present invention will be explained by referring a mobile communication terminal which supports systems such as a 2.5G system and an Universal Mobile Telecommunication System (UMTS). However, it should be noted that teachings of the present invention may be applicable to other communication systems.

Figure 4:
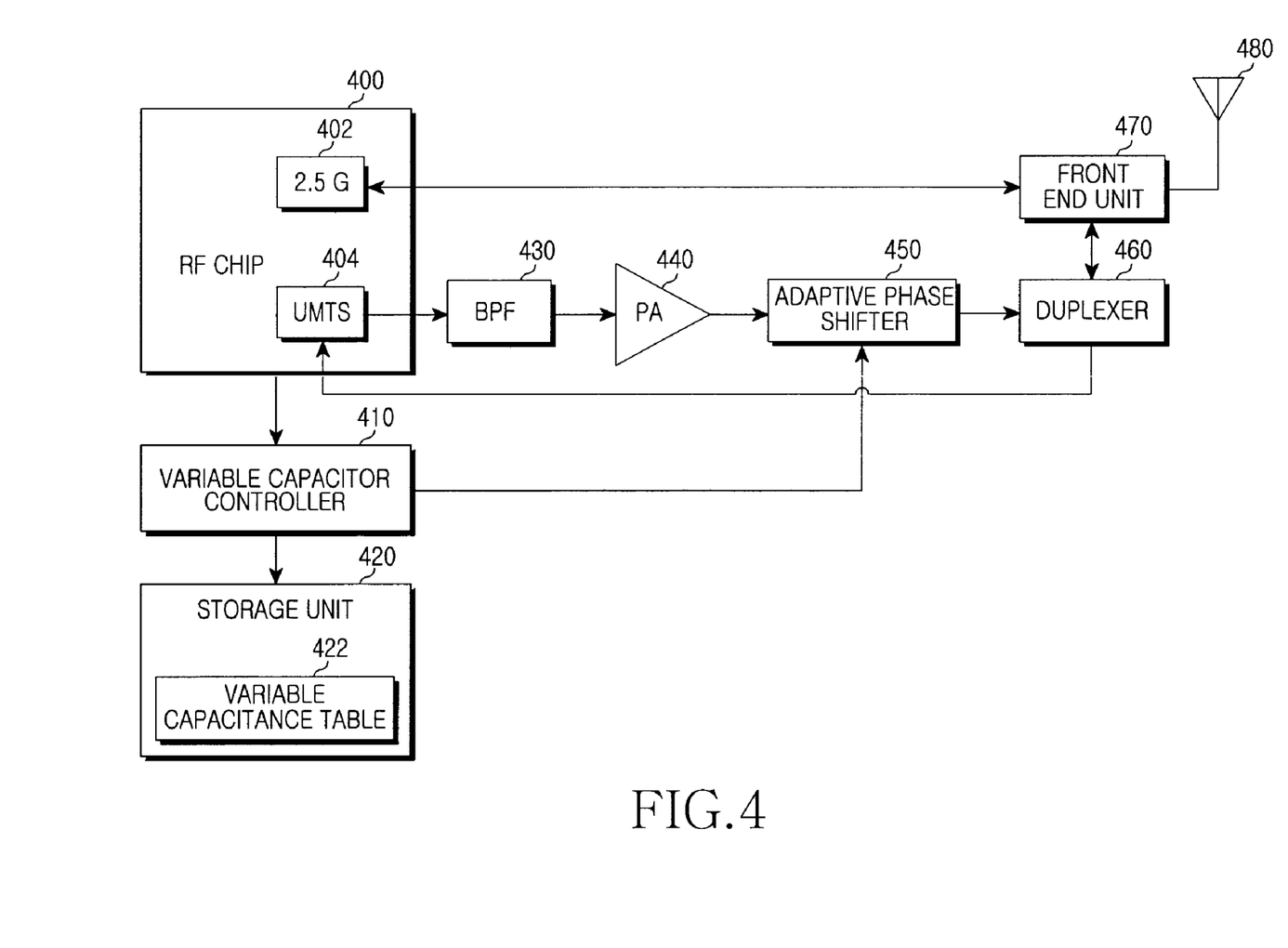
FIG. 4 illustrates a block diagram for a mobile communication terminal according to an exemplary embodiment of the present invention.

FIG. 4 illustrates a block diagram for a mobile communication terminal according to an exemplary embodiment of the present invention.

Referring to FIG. 4, the mobile communication terminal comprises a Radio Frequency (RF) chip 400, a variable capacitor controller 410, a storage unit 420, a Band Pass Filter (BPF) 430, a Power Amplifier (PA) 440, an adaptive phase shifter 450, a duplexer 460, a front end unit 470, and an antenna 480.

The RF chip 400 processes a high frequency signal for sending/receiving to/from a base station through the antenna 480. The RF chip 400 comprises a 2.5G module 402 which supports a 2.5G system and an UMTS module 404 which supports an UMTS system. For the purpose of simplicity, a detailed description and a configuration for the 2.5G system will be omitted as it is know in the art.

The UMTS module 404 processes an UMTS signal for sending to the base station and provides the processed UMTS signal to the BPF 430. The UMTS module 404 receives a signal through the duplexer 460 from the antenna 480.

The BPF 430 passes the signal of an UMTS bandwidth only from the UMTS module 404 to the PA 440, which amplifies the signal provided from the BPF 430 by a predetermined level and outputs the amplified signal.

The adaptive phase shifter 450 performs an impedance matching between an output terminal of the PA 440 and the antenna 480 by varying a capacitance value according to the control of the variable capacitor controller 410. That is, the adaptive phase shifter 450 comprises variable capacitors C1 (501) and C2 ((503) and inductors L1 (511), L2 (513) and L3 (515) as illustrated FIG. 5. The adaptive phase shifter 450 performs shifting a phase. outputted from the PA 440 by varying capacitance values according to a control signal from the variable capacitor controller 410, and the adaptive phase shifter 450 performs an impedance matching by shifting the phase.

Figure 5:
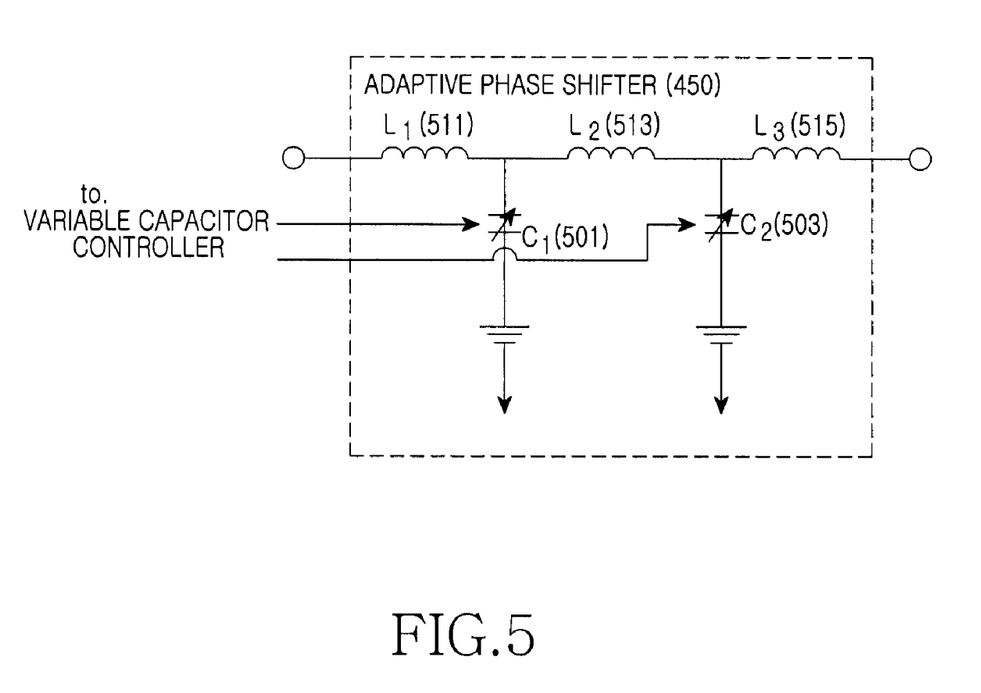
FIG. 5 illustrates a block diagram for an adaptive phase shifting unit in a mobile communication terminal according to an exemplary embodiment of the present invention.

Herein, it is possible for the varacters, of which capacitance values are varied according to a voltage, to be used as the variable capacitors C1 (501) and C2 (503).

The duplexer 460 provides a sending signal received from the adaptive phase shifter 450 to the front end unit 470 and provides a receiving signal received from the front end unit 470 to the adaptive phase shifter 450 according to a duplex scheme.

The front end unit 470 provides sending/receiving signals to corresponding modules by switching according to the frequency bandwidth of the sending/receiving signals.

That is, the front end unit 470 includes a switch and performs the switching to connect the 2.5G module 402 with the antenna 480 when the sending/receiving signals are belong to a bandwidth of the 2.5G system and performs the switching to connect the antenna 480 with the duplexer 460 which is connected with the UMTS module 404 when the sending/receiving signals are belong to a bandwidth of the UMTS system.

The variable capacitor controller 410 receives the frequency bandwidth information of the sending signal, i.e., channel index information, from the RF chip 400 according to the present invention. Thereafter, it determines optimum capacitance values from a predetermined table. The storage unit 420 stores a variable capacitance table 422 which represents a capacitance value corresponding to the channel index information.

After determining capacitance values corresponding to the channel index information from the storage unit 420, the variable capacitor controller 410 outputs control signals to change the capacitance values of variable capacitors C1 (501) and C2 (503) included in the adaptive phase shifter 450 to the determined capacitance values.

Herein, when the variable capacitors C1 (501) and C2 (503) included in the adaptive phase shifter 450 are varacters, the variable capacitor controller 410 may output voltages corresponding to the determined capacitance values using the control signals.

As stated before, the storage unit 420 stores a variable capacitance table 422 which represents a capacitance value corresponding to the channel index information.

Herein, the capacitance value corresponding to each channel denotes a capacitance value for an impedance matching of the output terminal of the PA 440 in order to provide a maximum power output for a transistor of the PA 440 per each channel.

Figure 6:
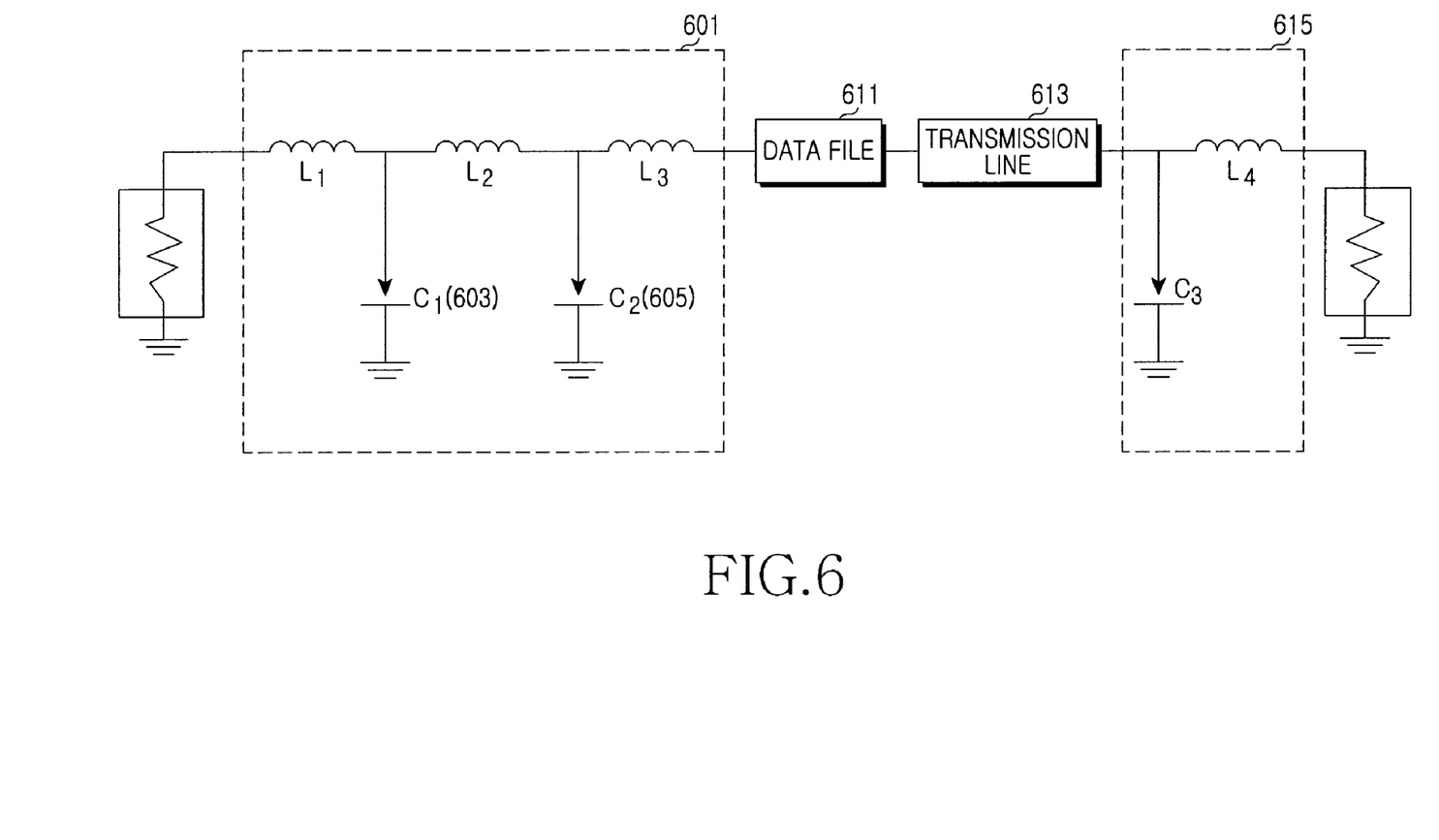
FIG. 6 illustrates a circuit configuration for acquiring load full data per each channel according to an exemplary embodiment of the present invention.

The variable capacitance table 422 that would yield a maximum power output for the PA 440 may be determined by experiments using a structure of FIG. 6. As illustrated in FIG.

6, a circuit to determine load full per a channel comprises an adaptive phase shifter 601 including inductors L1 (511), L2 (513) and L3 (515) and capacitors C1 (501) and C2 (503), a data file 611 which performs a role of the RF switch and the duplexer, a transmission line 613, and an antenna matching unit 615.

Herein, a designer determines the load full for each channel during a call connection of the terminal.

Further, the designer determines a cross point between a maximum power and a minimum current under the load full status for each channel, and the designer also determines a variable capacitance value in order to shift to a desired position corresponding to each channel through Advanced Design Systems (ADS) simulation.

Figure 7:
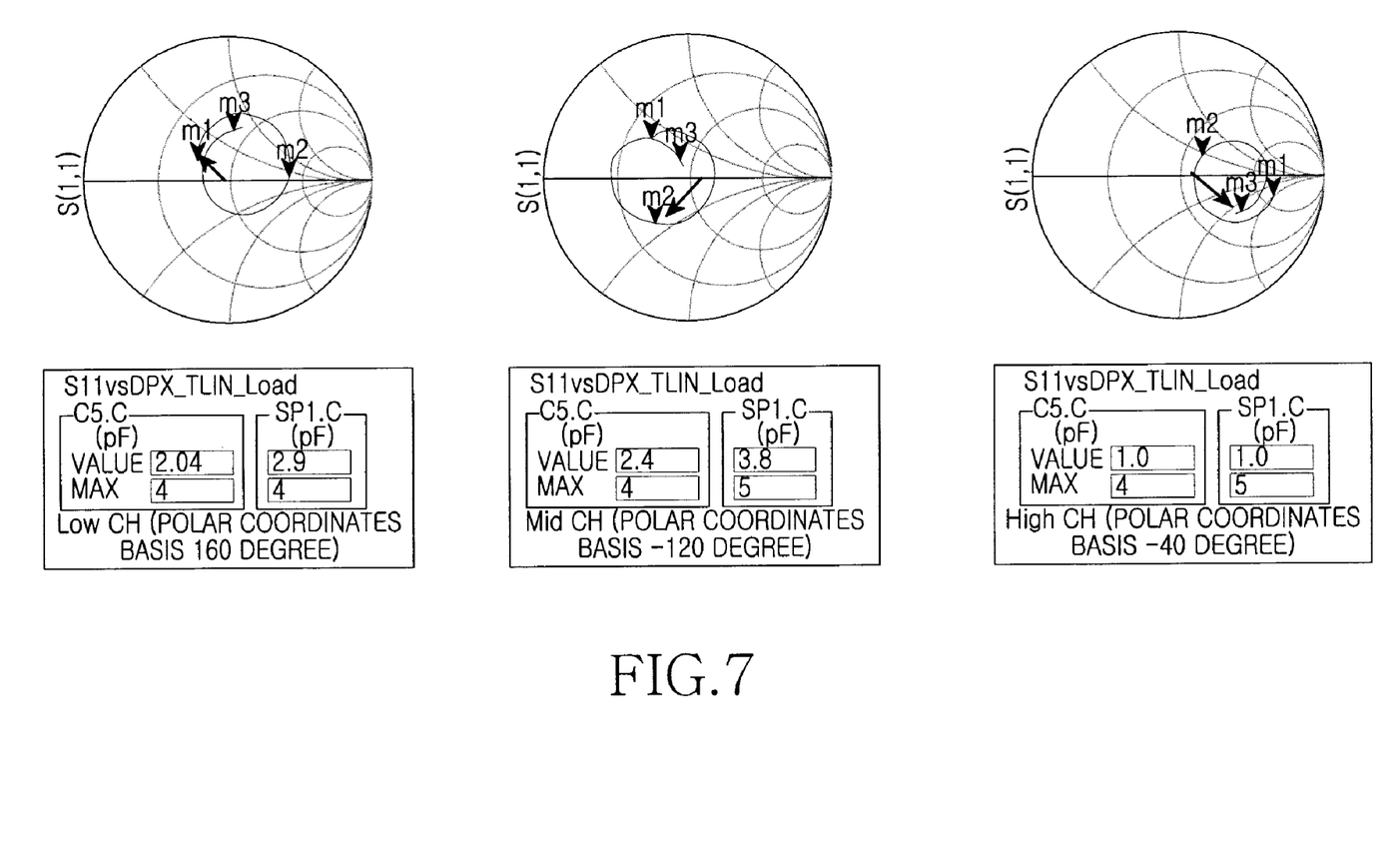
FIG. 7 illustrates load full data for each channel in a mobile communication terminal according to an exemplary embodiment of the present invention; and, FIG. 8 illustrates a flow chart for shifting a phase according to a channel in a mobile communication terminal according to an exemplary embodiment of the present invention.

For example, as illustrated in FIG. 7, the designer performs channel interpolation for each channel and configures the variable capacitance table for entire channel.

Figure 8:
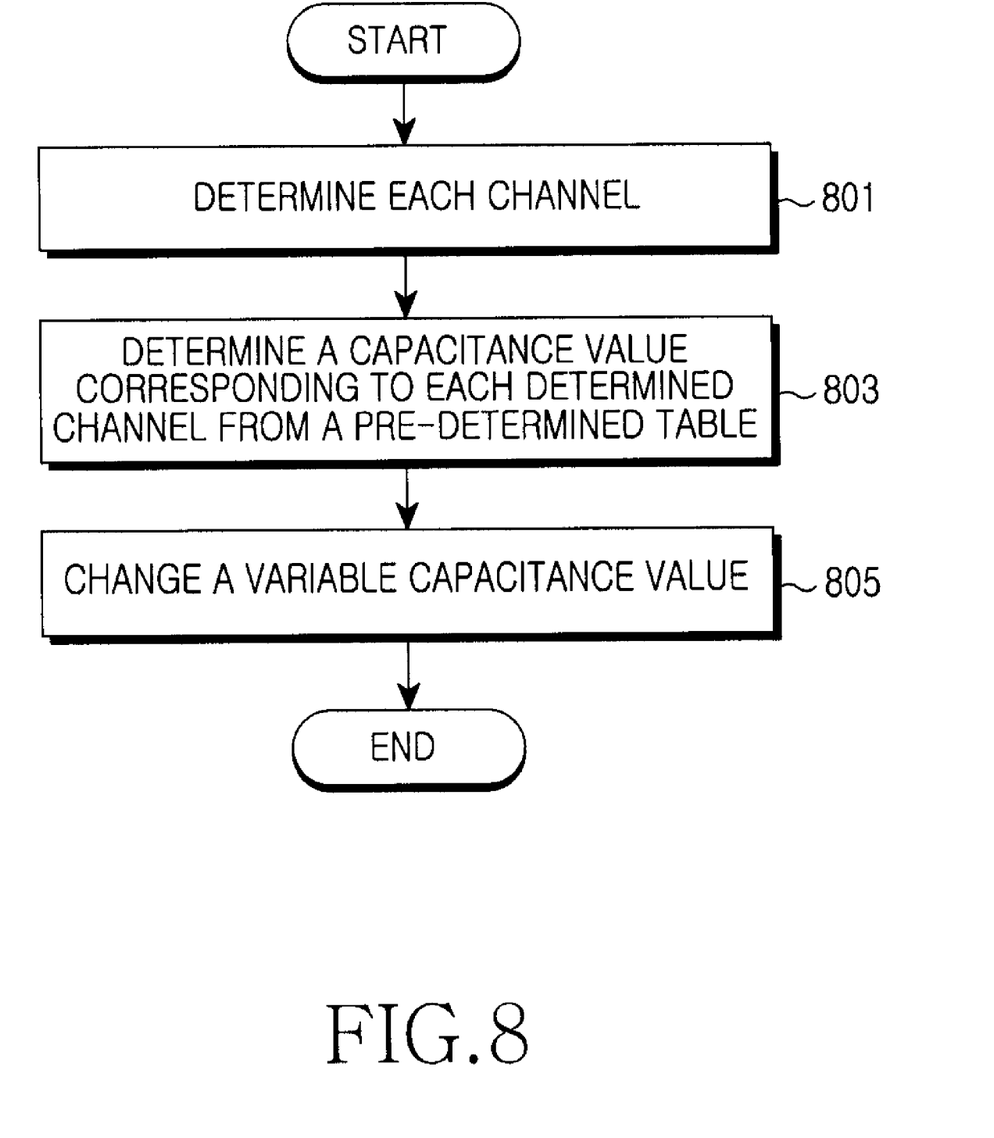

FIG. 8 illustrates a flow chart for shifting a phase according to a channel in a mobile communication terminal according to an exemplary embodiment of the present invention.

Referring to FIG. 8, the mobile communication terminal determines each channel for current sending/receiving signals through RF chip in step 801 and determines a capacitance value corresponding to each determined channel from a predetermined table in step 803.

Thereafter, the mobile communication terminal changes a variable capacitance value of the adaptive phase shifter between the output terminal of the PA in a transmitting unit and the duplexer in the transmitting unit to the determined capacitance values in step 805.

Herein, when the variable capacitor is a varacter, the mobile communication terminal controls a capacitance value of the variable capacitor through a control of a voltage which is applied to the variable capacitor.

Finally, the mobile communication terminal finishes an algorithm according to the present invention.

Having thus described a preferred embodiment of reducing a channel deviation, it should be apparent to those skilled in the art that certain advantages of the system and method have been achieved. In particular, the present reduces the conductive deviation per channel by adaptively shifting the phase of the output matching terminal of the power amplifier according to the change of channel in the mobile communication terminal. Thus, performances for an uniform power, a current, an ACLR and an ILPC in the entire channels are maintained, and a stable Total Radiated Power (TRP) can be maintained during an initial call connection or a soft handover, and a talk time can be maintained by minimizing a call drop ratio and reducing a current consumption.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for reducing a channel deviation in a mobile communication terminal, comprising:
    an amplifier for amplifying a transmitting signal by a predetermined level and outputting the amplified signal via an antenna;
    a phase shifter having a plurality of capacitors, each capacitance value of the plurality of variable capacitors is selectively varied to phase shift the signal outputted from the amplifier.
    a controller for outputting a control signal to control the plurality of variable capacitors to perform an impedance matching between the output of the amplifier and the antenna.

2. The apparatus of claim 1, further comprising;
    a memory for storing a plurality of predetermined variable capacitance values,
    wherein the controller determines a variable capacitance value corresponding to each channel of the transmitting signal and outputs the control signal to change a capacitance value of the plurality of variable capacitors of the phase shifter to the determined variable capacitance value.

3. The apparatus of claim 2, wherein the variable capacitance value stored in the memory is the capacitance value for matching the impedance of an output terminal of the amplifier in order to output a maximum power per channel by a transistor of the amplifier.

4. The apparatus of claim 1, wherein the phase shifter comprises at least two variable capacitors according to the control of the controller and at least three fixed valued inductors connected in series and coupled to the at least two variable capacitors in parallel.

5. The apparatus of claim 1, wherein the capacitor is a varactor.

6. The apparatus of claim 1, further comprising;
    a duplexer coupled to receive an output signal of the phase shifter; and,
    a front end unit.

7. The apparatus of claim 1, wherein the plurality of predetermined variable capacitance values is stored in the memory through a simulation.

8. A method for reducing a channel deviation in a mobile communication terminal, the method comprising:
    amplifying a transmitting signal by a predetermined level and outputting the amplified transmitting signal;
    determining a capacitance value of a variable capacitor from a predetermined table based on a channel information of the transmitting signal; and,
    performing a phase shift in the amplified transmitting signal by controlling the variable capacitor according to the determined capacitance value.

9. The method of claim 7, further comprising performing a simulation to generate the predetermined table containing the capacitance value of the variable capacitor.

10. The method of claim 8, wherein the determined capacitance value is used to perform an impedance matching of the amplification to output a maximum power.

11. The method of claim 8, wherein the phase shift is performed using at least two variable capacitors and at least three fixed valued inductors connected in series and coupled to the at least two variable capacitors in parallel.

12. The method of claim 8, wherein the variable capacitor is a varactor.

* * * * *